Figure 1:
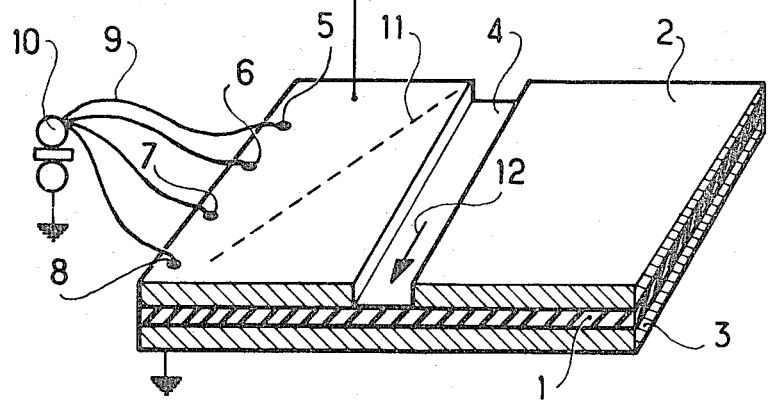

United States Patent [19]
Godard et al.

[11] 3,821,664
[45] June 28, 1974

[54] TRAVELING WAVE EXCITED GAS LASER

[75] Inventors: Bruno Godard, Gif Sur Yvette;
Bernard Lacour, Palaiseau, both of France

[73] Assignee: Compagnie Generale D'Electricite, Paris, France

[22] Filed: Mar. 19, 1973

[21] Appl. No.: 342,350

Related U.S. Application Data

[63] Continuation-in-part of Ser. No. 211,374, Dec. 23, 1971, Pat. No. 3,729,689.

[30] Foreign Application Priority Data

| Mar. 17, 1972 | France | 72.9391 |
| Apr. 17, 1972 | France | 72.13385 |
| July 28, 1972 | France | 72.27394 |
| Nov. 9, 1972 | France | 72.39752 |
| Nov. 21, 1972 | France | 72.41260 |
| Feb. 5, 1973 | Germany | 04013 |

[52] U.S. Cl. ...... 331/94.5 R, 331/94.5 G, 330/4.3, 333/21, 333/31, 343/781, 343/783, 343/785

[51] Int. Cl. ........ H01s 3/09, H01s 3/02, H01s 3/22

[58] Field of Search ............... 331/94.5; 333/21, 31; 343/781, 783, 785; 330/4.3

[56] References Cited
UNITED STATES PATENTS

| 3,729,689 | 4/1973 | Godard et al. | 331/94.5 |
| 3,757,248 | 9/1973 | Small | 331/94.5 |

*Primary Examiner*—Ronald L. Wibert
*Assistant Examiner*—R. T. Webster
*Attorney, Agent, or Firm*—Sughrue, Rothwell, Mion, Zinn & Macpeak

[57] ABSTRACT

A gas laser comprising an electric excitation line consisting of a sandwich of two metal plates separated by an insulating plate. The metal plates are in the form of parabolas, the focal points and the apices of the parabolas being situated on respective normals to the plane of the plates. Each metal plate has a discharge channel containing an active laser medium.

23 Claims, 17 Drawing Figures

3,821,664

TRAVELING WAVE EXCITED GAS LASER

CROSS-REFERENCE TO RELATED APPLICATION

This application is a continuation-in-part of U.S. Application Ser. No. 211,374, filed Dec. 23, 1971, now U.S. Pat. No. 3,729,689, issued Apr. 24, 1973.

The present invention relates to a gas laser and in particular a gas laser where stimulated emission is obtained as a result of an electric discharge in a gaseous medium. This invention relates to an improvement and/or modification over the above U.S. Patent (corresponding to British Pat. No. 1,301,639) hereinafter referred to as the main patent.

In the main patent there is described a laser comprising a gaseous medium; a flat electric excitation line comprising an insulating plate disposed between first and second metallic plates which are parallel to each other and connected respectively to two terminals of a voltage supply, the first metallic plate having at least one channel dividing it into two distinct parts; means for holding a gaseous medium in the channel characterised by the fact that an edge of the first metallic plate is in the form of a parabola, the axis of the parabola making an non-zero angle $\alpha$ with the channel, and means for exciting a current wave in the excitation line provided by a substantially point source between the metallic plates at the focus of the parabola, this point source initiating the discharge.

The present addition is intended to improve the laser structures proposed in the main patent.

According to the present invention there is provided a gas laser comprising an electric excitation line provided by an insulating plate disposed between first and second parallel metal plates adapted to be respectively connected to two terminals of a voltage supply, a channel for receiving an active medium being formed in the first plate and separating it into two separate parts, respective edge portions of the first and second plates being formed as parabolas whose axes of symmetry make a non-zero angle $\alpha$ with the axis of the channel, the angle $\alpha$ being such that cos $\alpha$ is equal to the ratio of the speed of propagation of a current wave in the plates along the axes of the parabolas to the speed of propagation of the emissive radiation in the direction of the channel, the dimensions of the parabolas forming the edge portions of the two plates being substantially identical, their focal points and apexes lying on the same respective normals to the plane of the plates, and a substantially point source of current wave at the focal points of the parabolas.

Figure 2:
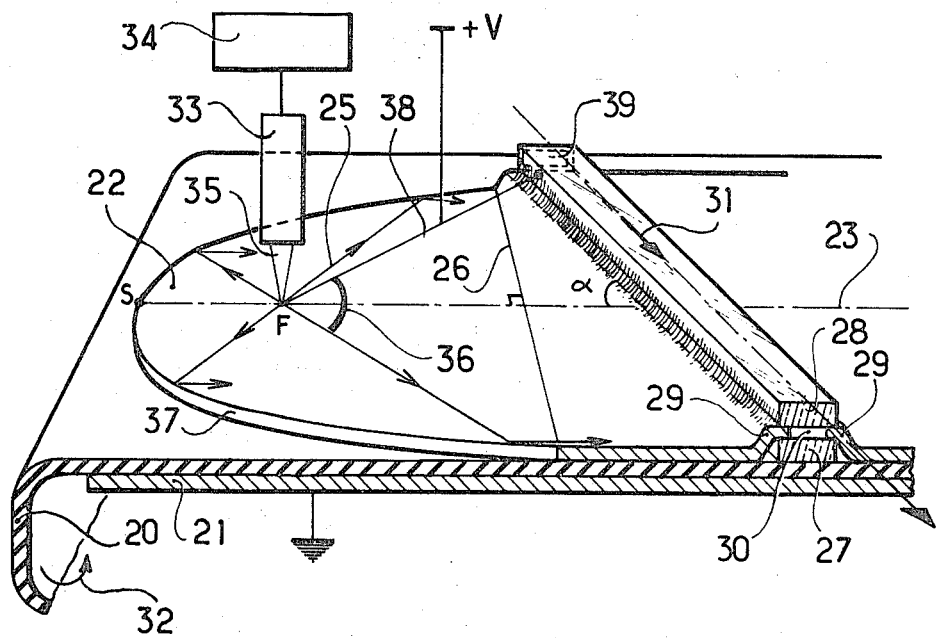
Figure 3:
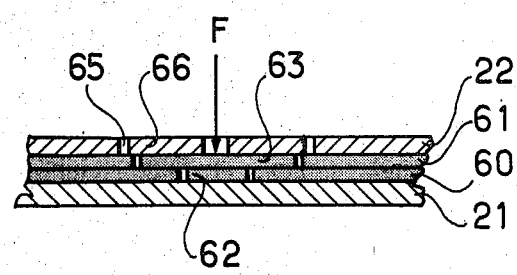
Figure 4:
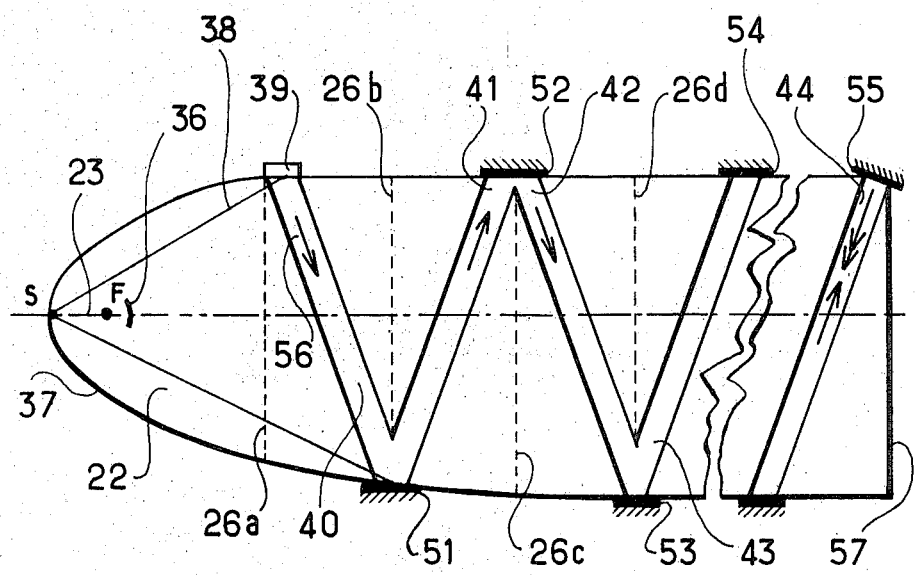
Figure 5:
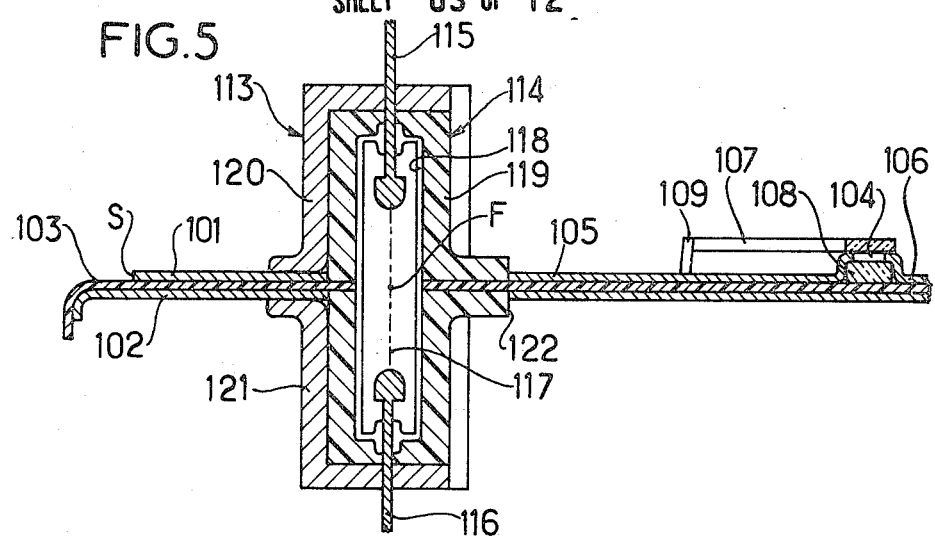
Figure 6:
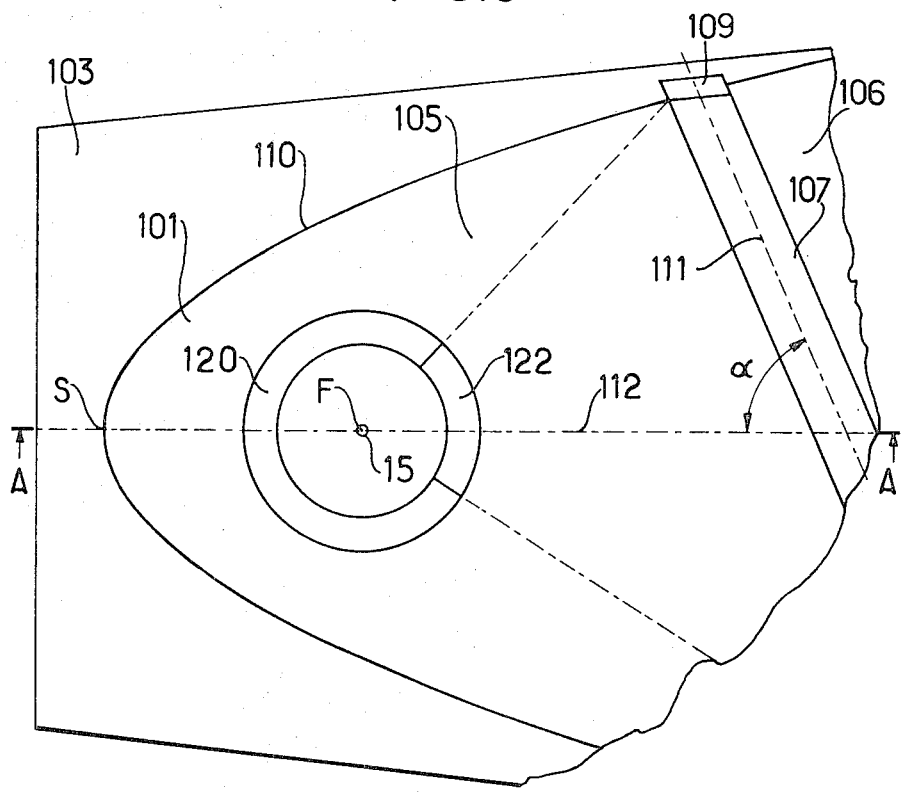
Figure 7:
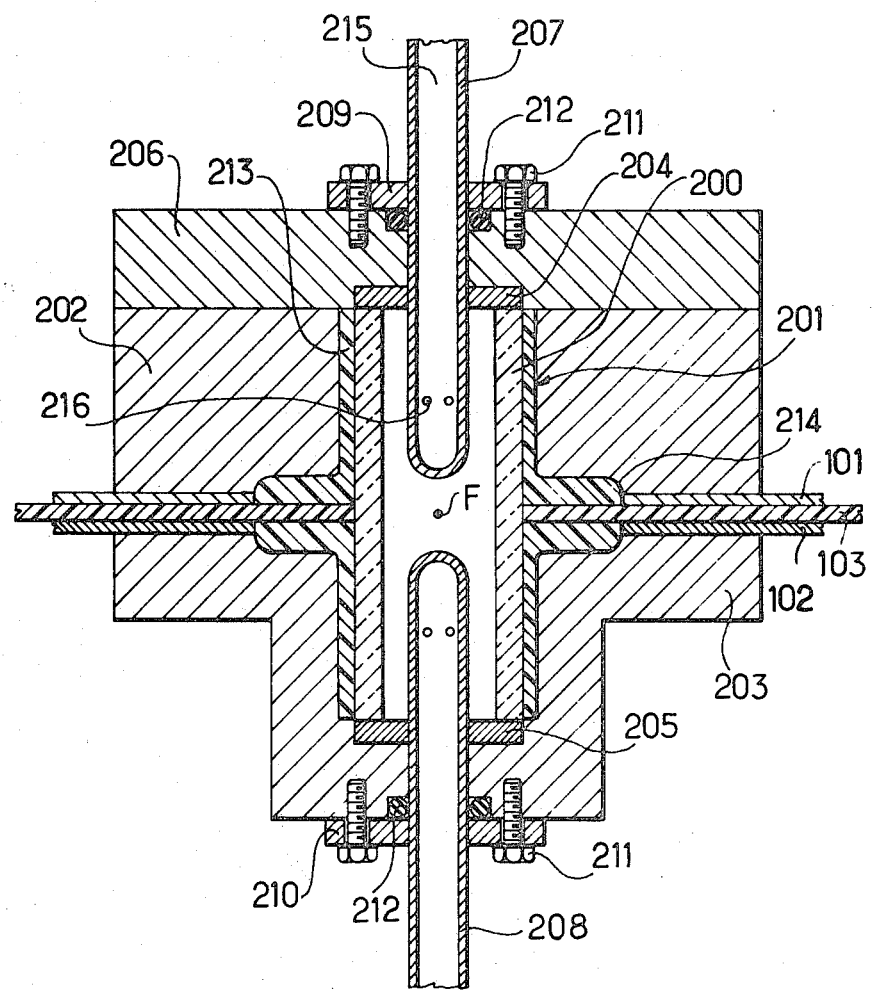
Figure 8:
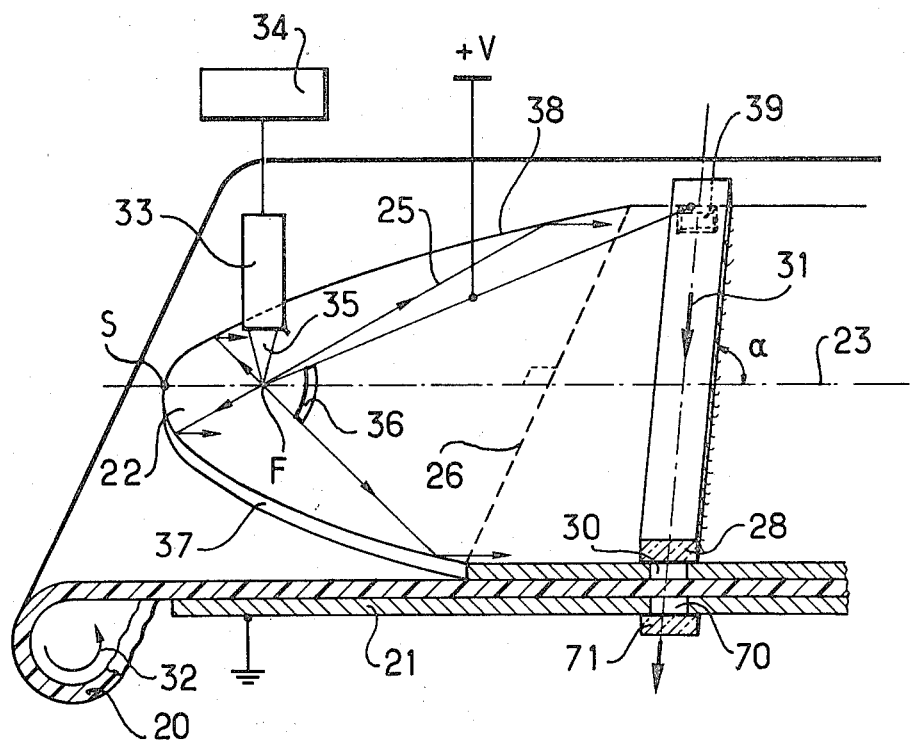
Figure 9:
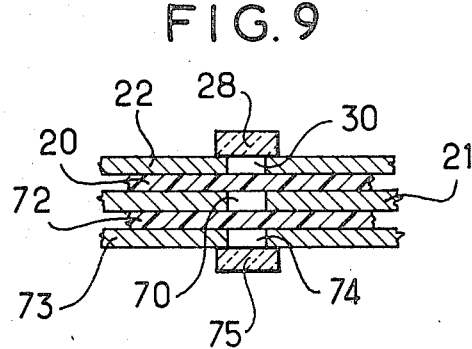
Figure 10:
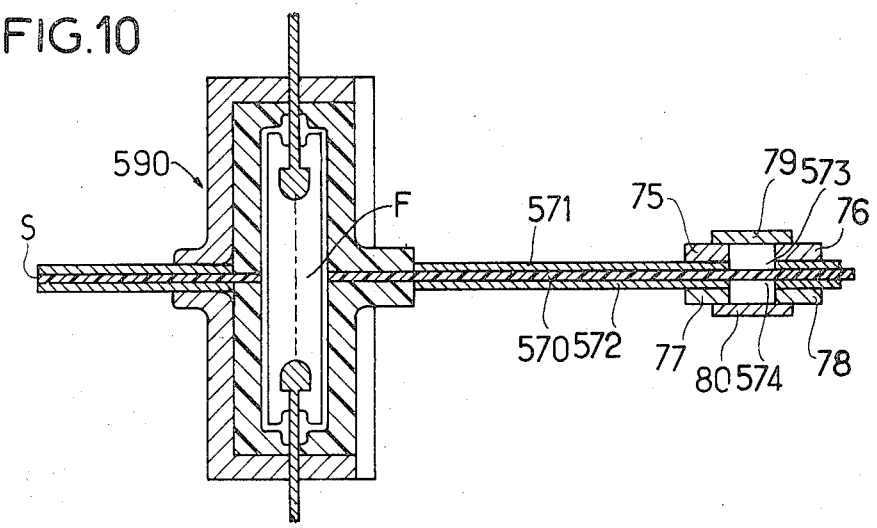
Figure 11:
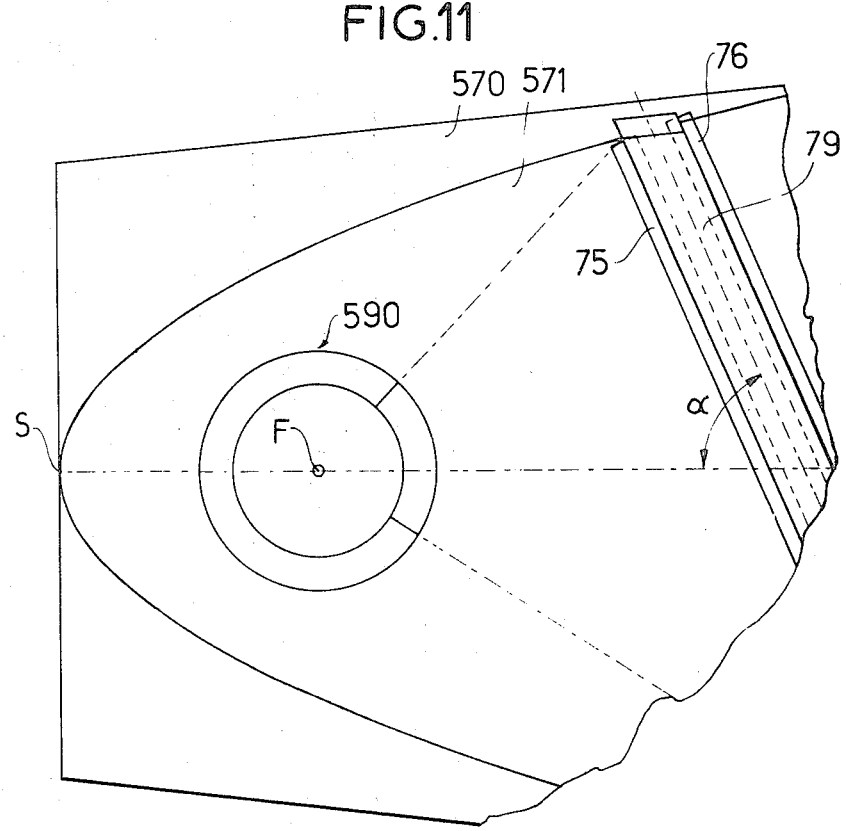
Figure 12:
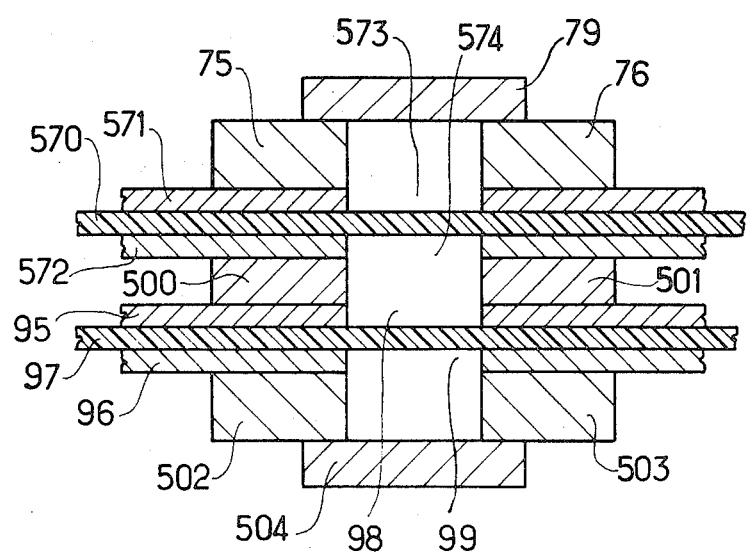
Figure 13:
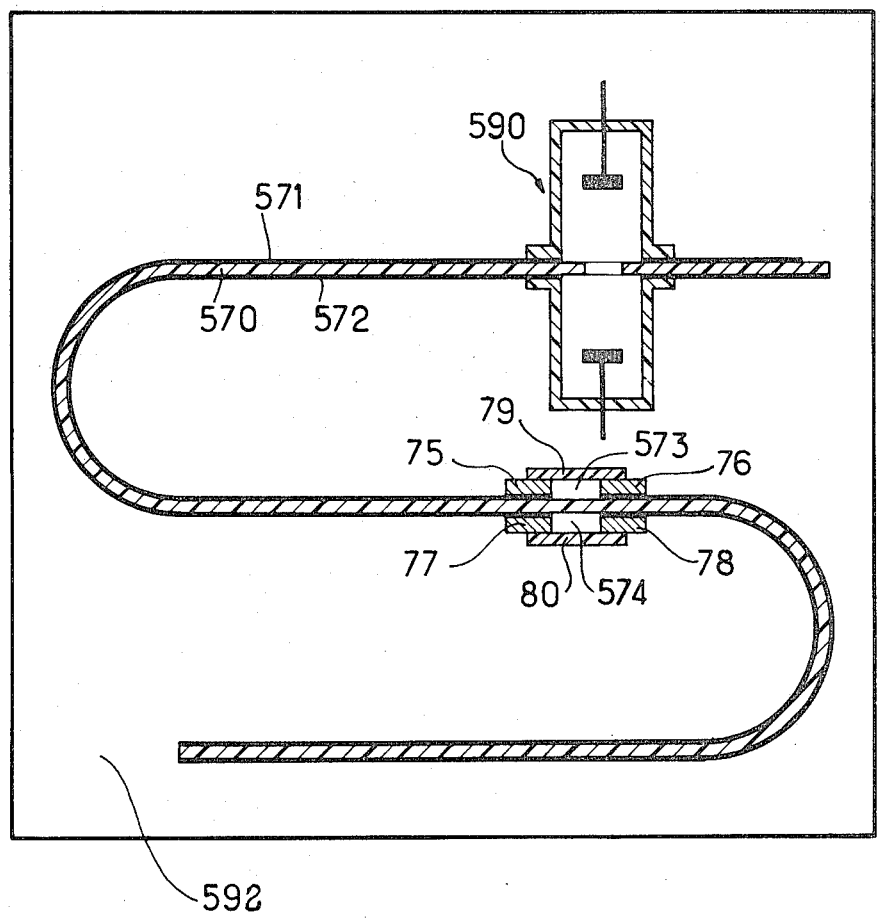
Figure 14:
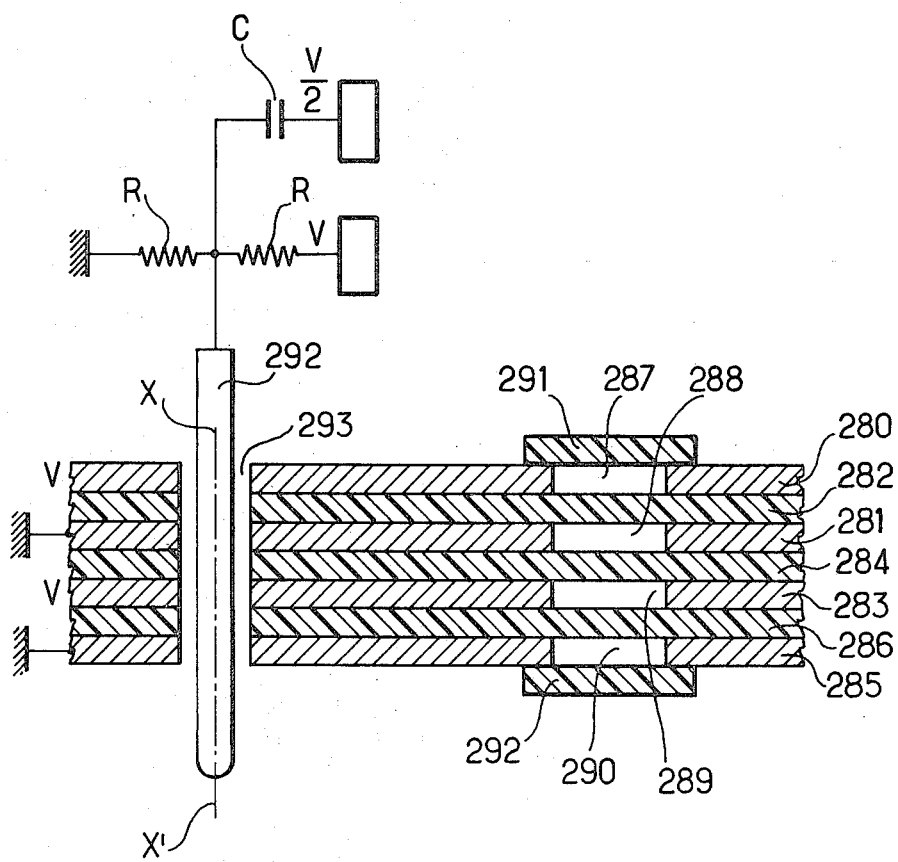
Figure 15:
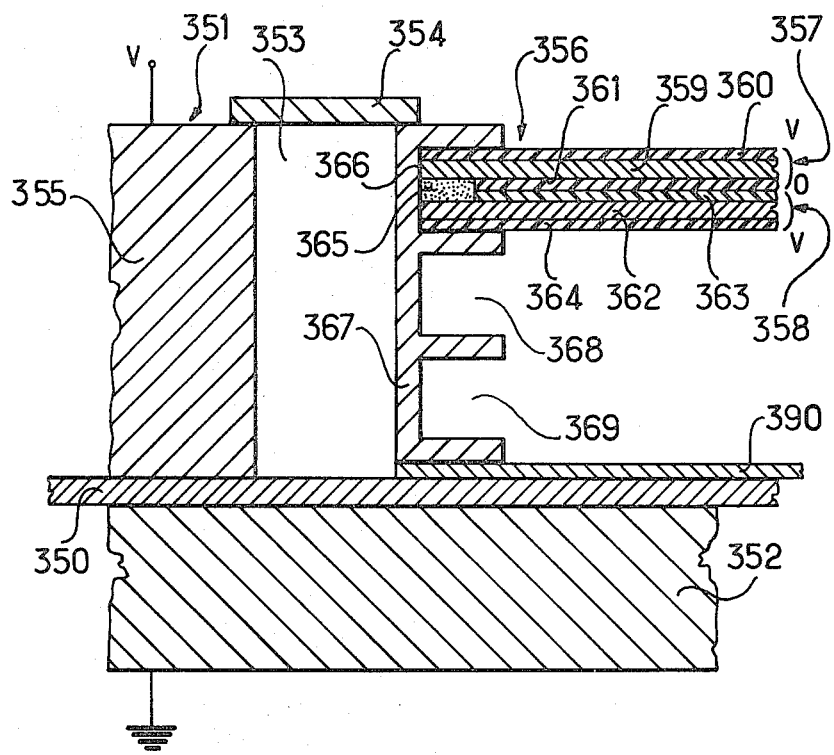
Figure 16:
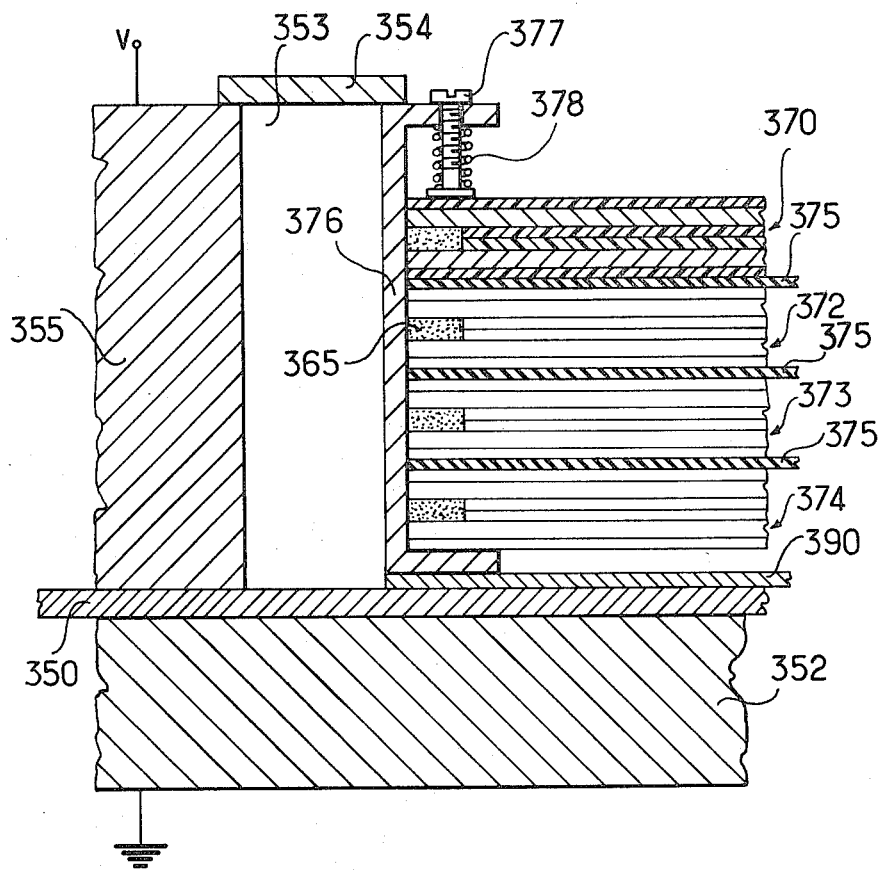
Figure 17:
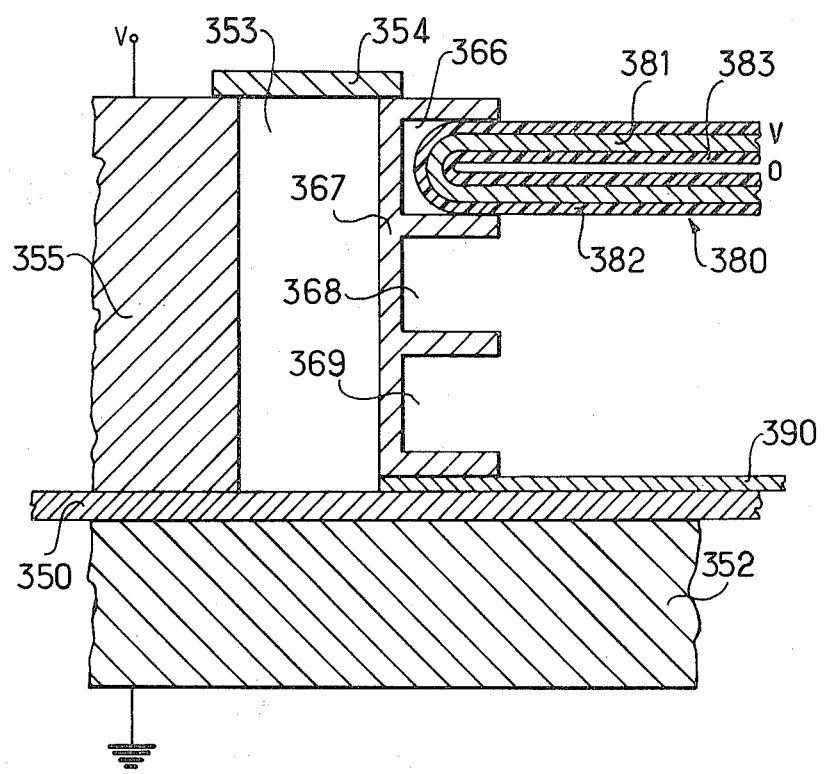

The invention will now be described in more detail, by way of example only, with reference to the accompanying drawings, in which:

FIG. 1 is a perspective view of a known gas laser;
FIG. 2 is a perspective view of a gas laser described in the main patent;
FIG. 3 shows a cross-section of a flat excitation line
FIG. 4 is a plan view of a second form of gas laser described in the main patent;
FIG. 5 is a cross-sectional view of a third form of laser described in the main patent;
FIG. 6 is a plan view of the third form of laser;
FIG. 7 is a cross-section of a new trigger device;
FIG. 8 shows a new form of gas laser;
FIG. 9 is a cross-section through a part of a second new form of laser;
FIG. 10 is a cross-sectional view of the second new form of trigger device;
FIG. 11 is a plan view of FIG. 10;
FIG. 12 is a variant of part of the trigger device shown in FIG. 10;
FIG. 13 illustrates the operation of the laser and trigger device shown in FIGS. 10, 11 and 12;
FIG. 14 is a cross-section through part of a third form of new laser;
FIG. 15 is a cross-section through a part of a fourth form of new laser;
FIG. 16 shows a first variant on the laser shown in FIG. 15;
FIG. 17 shows a second variant of the laser shown in FIG. 15.

FIG. 1 shows a known gas laser which is described in the main patent.

Referring to FIG. 1, the known gas laser has a flat electric line provided by an insulative plate 1 sandwiched between two parallel metal plates 2 and 3 held at different potentials.

A channel 4 divides the plate 2 into two different portions. The channel 4 receives a gaseous medium at atmospheric pressure. The gaseous medium can be one of the constituents of air, for example nitrogen.

Point sources 5, 6, and 7 and 8 for producing electric discharges in the insulating plate 1 are aligned along a line parallel to the axis of the channel 4. These discharge sources are connected to a pulse generator 10 by coaxial cables, one of which is shown at 9.

These coaxial cables have different lengths and form variable delay lines transmitting successively a pulse from the generator 10 to the sources 5, 6, and 7 and 8. The envelope of the spherical surfaces of the discharge waves created in the dielectric at the point sources 5, 6, 7 and 8 is a surface of a progressive wave shown by the line 11 and it makes an angle $\pi/2 - \alpha$ with the axis 12 of the channel 4 where $\alpha$ is the angle in radius between the line 11 and a perpendicular to the axis 12.

As the surface of the wave 11 progresses, different points of the wave front arrive at the active medium, excite it, and produce stimulated emission propagating along the axis 12 of the channel 4.

For maximum power output of the laser, the speed of propagation of the discharge wave in the direction 12 should be constant and the angle between the surface of the wave 11 and the direction 12 should be such that the speed of propagation of the discharge wave is equal to the speed of propagation of stimulated emission in the direction 12.

These conditions cannot be realised with the known laser, particularly as the progressive wave produced by the line is not strictly plane. By using a large number of discharge sources, a resulting wave which is substantially plane can be produced but this necessitates the use of complicated pulse generators.

Referring to FIG. 2, the gas laser includes a flat line provided by an insulative plate 20 sandwiched between a first metallic plate 21 and a second metallic plate 22 held at different potentials. The insulative plate 20 is in the form of a sheet which can be rolled up at one end 32 by a mechanical device (not shown) which pulls it through the plates.

The second plate 22 has one edge in the form of a parabola 37 having an axis of symmetry 23, a focus $f$ and turning point $s$.

An auxiliary laser 33 controlled by electronic circuitry 34 emits light pulses 35 focussed on the focus $f$ of the parabola 37. The laser 33 is arranged so that its beam has sufficient energy to pierce the metal plate 22 and the insulation plate 20. Alternatively, the metal plate 22 can have a cylindrical hole formed at the focus $f$ and in this case the energy of the laser beam must be sufficient to pierce the insulative plate 20.

The time for the discharge wave front to build up is preferably less than twice the propagation time of a discharge wave in the flat line for its travel from the focus $f$ to the point $g$ of the parabola. This time is in the order of one nanosecond.

A channel 30 for receiving an active medium divides the plate 22 into two distinct portions. The edges of the portions of the plate 22 bordering the channel are sandwiched between two insulative strips 28 and 27 so as to leave a gap 30 for containing the active medium. These edges are bent outwardly to accommodate the strip 27 and form elbows 29. The ends of channel 30 are closed by two windows, one of which is shown at 39.

If the gaseous active medium is air under atmospheric pressure, the channel 30 need not be closed and the strips 27 and 28 and windows 39 are not necessary.

The cosine of the angle $\alpha$ between the axis of symmetry of the parabola 37 and the axis 31 of the channel 30 is equal to the ratio of the component of the speed of propagation of a discharge wave in the line in the direction of the axis 23 to the speed of propagation of stimulated emission in the direction 31 of the channel 30. The ends of the channel 30 cut the plate 22 at two points of the parabola 37.

A reflector 36 on the side of the plate remote from the point $s$ is formed by an arcuate hole in the plate 22, the centre of curvature of the arc being the point $f$. The length of the arc is limited by two lines joining the point $f$ to the ends of the channel 30, one such line being shown at 38.

The operation of the laser will now be described.

At a given moment in time, the laser 33 emits a light impulse which pierces the plate 20 at the focus $f$ of the parabola 37. The discharge wave emitted has a symmetry of revolution in relation to the focus $f$. The fraction of the surface of the discharge wave being included in the angle defined by the line 38 and its counterpart is reflected by the reflector 36. All waves emitted from the focus $f$ are therefore directed towards the parabola 37 and are reflected off the parabola. A parabola is perfectly stigmatic for two conjugate points, its focus $f$ and infinity. The surface of the wave coming from $f$ is reflected by the parabola and is therefore a surface of a wave perfectly plane and perpendicular to the axis 23 of the parabola 37, shown by the line 26.

Successive points of the discharge wave 26 therefore arrive successively at the channel 30 and stimulate the atoms or molecules of the active gas. Stimulated emission therefore occurs progressively from one end of the channel to the other in the direction of the arrow 31 and at the same speed as the progressive wave 26 in the direction of this channel. This condition enables a powerful coherent laser beam to be produced at the end of the channel 30.

The laser can be easily constructed and only requires one point discharge source. The electrical supply of the discharge line is therefore considerably simplified. Furthermore, the surface of the discharge wave has fewer aberrations than that of gas lasers that have been proposed. After the emission of a laser pulse, the sheet 20 is pulled between the plates 21 and 22, by winding it up at 32, so as to move the hole in the plate 20 out of the region bounded by the parabola and the channel.

As an alternative to the laser 33, a mechanical tool for piercing the plate 20, a voltage generator for producing an electrical discharge in the plate 20 at the focus $f$, or a similar device may be used.

The placing of the plate 20 can be a long and difficult operation, and a line structure as shown in FIG. 3 can alleviate this disadvantage.

Referring to FIG. 3, the plate 20 comprises two dielectric sheets 60 and 61 superimposed on each other. At the focus $f$ of the parabola, the metallic plate 22 has a cylindrical hole 65 in which is placed a metallic disc 66 having a further hole at the focus $f$.

The sheets 60 and 61 have two further holes under the hole 65 which are filled by discs 62 and 63, the disc 63 having a diameter greater than that of the disc 62. The interstices between the discs can be filled with an insulative grease.

After discharge, the discs may be replaced, it being unnecessary to displace the dielectric plate.

Referring to FIG. 4, the laser has an excitation line with a plate 22 having a parabolic edge 37, a focus $f$, a turning point $s$, and a reflector 36. This laser has several channels of which four are shown at 40, 41, 42, 43 and 44. These channels lie across the first plate and make oblique angles with the axis of the parabola. The channels communicate at the edges of the first plate and are optically connected together with the aid of mirrors 51, 52, 53, 54. The last two channels, one of each side of the broken line, are not shown connected together to indicate that the number of communicating channels may be chosen to meet the requirements of a particular situation.

Successive positions of the surface of a discharge wave are shown by the dotted lines 26a, 26b, 26c, 26d. This wave surface makes a constant angle with the laser tubes and thus successively causes stimulated emission along the laser path. The final mirror 55 can be semi-transparent to allow the laser beam to pass. Alternatively, it can be totally reflecting and orientated at right angles to the axis of the tube 44. The discharge wave is reflected by the end 57 of the line and reexcites in the same condition as the active media of the laser tubes (in the sense of the double arrow).

Such an excitation flat line allows very rapid excitation of energy levels of a gas such as hydrogen or nitrogen thus allowing the obtention of ultra-violent radiation.

Although good results may be obtained with this triggering circuit, nevertheless after each firing of the laser it is necessary to replace the dielectric separating the two metallic plates at the focus.

The laser shown in FIGS. 5 and 6 alleviates this disadvantage.

Referring to FIGS. 5 and 6, an insulative material 103 is sandwiched between two metallic plates 101 and 102, the metallic plates 101 and 102 being substantially parallel. A channel 104 divides the plate 101 into two distinct portions 105 and 106. This channel 104 forms a cavity containing an active gaseous medium. It is closed in a gas-tight manner by two dielectric plates 107 and 108 and closed at its ends by two windows, one of which is shown an 109. The plate 101 has its edge 110 cut into the form of a parabola having a focus $f$ and turning point $s$, the channel 104 being positioned in the plate 101 so that it is on a side of the focus $f$ remote from the point $s$. The axis 111 of the channel 104 makes a non-zero angle with the axis of the parabola.

The laser has a trigger circuit 113 provided by a cavity 114 containing an active gas, for example a mixture of nitrogen and hydrogen, or nitrogen and sulphur hexafluoride $SF_6$, the two electrodes 115 and 116 are disposed in the cavity, a common axis 117 of the electrodes passing through the focus $f$ of the parabola bounded by the edge 110 of the plate 101. The cavity 114 crosses the plates, 101, 103 and 102 and is made of a dielectric material. This cavity has an interior envelope 118 of glass, on the wall of which are fixed the electrodes 115 and 116, and a second outer envelope 119 made preferably of a material moulded around the interior envelope 118.

In order to avoid electric discharges between the plate 101 and the plate 102, the dielectric material plate 103 penetrates the outer envelope 119 just up to the interior envelope 118, so that one part of the lateral exterior surface of the outer envelope 119 overlaps the part of the dielectric plate which is situated at the periphery of the interior envelope 118. The laser also includes means for electrically connexting electrodes 115 and 116 to respective metal plates 101 and 102, preferably so that the electrical path between the electrodes and plates are equal. These connections are made by two metallic parts 120 and 121 connected from the electrodes 115 and 116 to the respective metal plates 101 and 102. These metal parts are placed only on the side of the cavity facing the focus $f$. On the side of the cavity remote from the focus $f$, a high impedance 122 separates the two metallic plates. This impedance 122 is a part of the dielectric material forming the outer envelope 119. In this way the electric wave originating substantially from the focus $f$ does not propagate directly towards the channel 104 but it is reflected on the parabolic edge 110 of the plate before arriving at the channel 104.

The trigger circuit shown in FIG. 7 comprises two metallic plates 101 and 102 disposed on either side of an insulating plate 103 forming a flat electric excitation line, for use in the laser described and referenced FIGS. 5 and 6. In the Figures corresponding parts are referenced with like reference numerals.

The trigger device comprises a glass tube 200 arranged in a bore 201 in two metal blocks 202 and 203 carried respectively on the plates 101 and 102. The tube 200 has its ends blocked with flat seals 204 and 205. A metallic plate 206 is disposed on the block 202, an electrode 207 passing through the plate 206 and the seal 205. Similarly an electrode 208 passes through the seal 205 and the block 203.

The electrodes 207 and 208 are held firmly in position by washers 209 and 210 which are screwed by scews 211 into the plate 206 and thus 203 respectively. Toroidal seals 212 are preferably placed around the electrodes and inside the washers to improve the sealing of the electrodes.

A plastics material 213 fills the space in the bore 201 around the tube 200 as well as in grooves 214 disposed on the faces of the block 202 and 203 so that the plastics material covers both sides of the insulating plate 103 in the region of the bore 201. The plastics material is also in contact with the ends of the plates 101 and 102. Finally the electrodes 207 and 208 each have a central bore 215 leading to small apertures 216 in the wall of the electrodes. This allows a gas which in the circumstances is usually nitrogen to be led into the tube 200.

The described trigger circuit has a particularly simple structure and allows easy access to the electrode by taking the various constituent parts to pieces.

The laser shown in FIG. 8 is similar to that shown in FIG. 2 and comprises a flat electric excitation line consisting of a flat insulating plate 20 disposed between a first metallic plate 22 and the second metallic plate 21 held at different potentials.

One of the ends of the plate 22 is shaped in the form of a parabola 37 having an axis of symmetry 23, a focus $f$, and an apex $s$.

The laser comprises means for initiating an electric discharge substantially at the focal point $f$ of the parabola 37. The means may be provided by an auxiliary gas laser 33 controlled by electronic circuitry 34 and capable of emitting light pulses 35 focussed on the focal point $f$ of the parabola 37.

A channel 30 containing a gaseous active medium is formed in the plate 22 thus dividing it into two parts.

Similarly a channel 70 is formed in the second metallic plate 21 dividing it into two separate parts, the channel 70 being arranged immediately below the channel 30 and having its two ends blocked by windows (not shown) similar to the windows 39 blocking the channel 30. The channel 70 is also blocked by an insulating strip 71 similar to the insulating strip 28 blocking the channel 30 and glued to the two edges of the channel 70. The channel 70 is thus bounded by two edges of the plates 21, the strip 71, and the insulating plate 20.

FIG. 9 shows a partial view of a variant having a second electric excitation line. In this figure the components forming the first excitation are referenced as in FIG. 8, that is the metal plates 22 and 21, the insulating plate 20, and the channels 30 and 70.

The insulating strip 28 blocks the channel 30 but a second line is associated with the first line such that the first metallic plate of the second line is common with the second plate 21 of the first line. The second line comprises an insulating plate 72 and a second metal plate 73, in which a channel 74 blocked by an insulating strip 75 is formed. The strip 75 is similar to the strip 28. The channel 70 is blocked by insulating plates 20 and 72.

It should be noted that the edges of the plates 21 and 73 can be of parabolic form having dimensions substantially identical to the dimensions of the parabola 37 of plate 22, the focal point and apexes of these parabolas being situated on the same normal to the plate of the plates.

Such a gas laser allows very high powers to be obtained.

In FIG. 10 a gas laser comprises an insulating sheet 570 on the faces of which are disposed by any appropriate means first and second metallic layers 571 and 572. In the drawing the thickness of these layers has been considerably exaggerated in order to enable them to be seen more clearly.

The laser formed by the insulating sheets 570 and the two layers 571 and 572 comprises an non-rigid assembly capable of being very easily rolled up on itself. The sheet 570 can be made of a plastics material such as "MYLAR" and the metallic layers may be formed by depositing copper.

Channels 573 and 574 are formed in the metallic layers 571 and 572. Metallic strips surround the edges of the channels 573 and 574 so as to increase the effective depth of the channels which are themselves blocked off by insulating strips 79 and 80. These are arranged across respective pairs of metal strips 75, 76 and 77, 78.

In FIG. 11 the first metallic layer 571 is shown having one end shaped as a parabola having a focal point $s$ and apex $f$ as described for example in FIG. 8.

The trigger circuit, generally referenced 590, is similar to that described with reference to FIG. 5 and will not be described again in detail.

The laser shown in FIG. 12 has two flat electric excitation lines. The device comprises a first electric excitation line formed by metal layers 571 and 572 deposited on the insulating sheet 570. The channels 573 and 574 are formed in the layers 571 and 572, the metallic strips 75 and 76 being arranged around the channel 573 to increase its depth. The insulating strip 79 is placed over the metal strip 75 and 76.

A second electric excitation line is provided by metallic layers 95 and 96 deposited on an insulating sheet 97, channels 98 and 99 being formed in the respective layers 95 and 96. Metallic strips 500 and 501 are arranged on either side of the channel 98 and wedged between the metallic layers 578 and 95, while the strips 502 and 503 are arranged on either side of the channel 99. An insulating strip 504 is arranged across the strips 502 and 503 so as to block off the channel 99.

It is possible to add additional excitation lines similar to those already described in order to increase still further the emission power of the resulting laser.

The second metallic layers of each of the excitation lines can also be cut into the form of the parabola having dimensions substantially the same as those of the parabolas forming the first metallic layers.

In this embodiment the use of metallic layers deposited on an insulating sheet avoids the disadvantage caused by the presence of pockets of air which tend to lead to impedance discontinuities. A laser having deposited layers therefore tends to have a greater stability. The laser formed as described also tends to be highly flexible which allows it to be rolled up and thus have a much smaller size than would otherwise be the case for a given power.

To illustrate this point, FIG. 13 shows the embodiment shown in FIG. 10 which comprises a flexible insulating sheet 570 with layers 571 and 572 folded back on themselves. In this case the trigger circuit 590 is disposed near the channels 573 and 574 containing the active medium.

The gas is also contained in a protective envelope 592, which in this case is a polyethylene covering in which openings have been formed opposite the ends of the channels 573 and 573 so that the laser beam can pass through them.

Such a structure has a relatively small size enabling it to be transported into awkward places.

The variant of the laser shown in FIG. 14 has three electric excitation lines, a first line formed by metallic plates 280 and 281 disposed on either side of an insulating plate 282, a second excitation line formed by the plate 281 and the metallic plate 283 deposited on either side of an insulating plate 284, and a third excitation line formed by the plate 283 and another metallic plate 285 disposed on either side of an insulating plate 286. Channels 287, 288, 289 and 290 are formed in the plates 280, 281, 283 and 285 respectively. The outer channels 287 and 290 are blocked off by insulating strips 291 and 297 so that all the channels can contain the active lasing medium.

The edges of the metal plates can be shaped in the form of a parabola, as was described with reference for example to FIG. 8, the focal point and apexes of the parabolas being situated on the same normal through the plane of the plates.

The trigger device for providing a substantially point source of a discharge between the plates at the foci of the parabolas comprises a cylindrical electrode 292 arranged coaxially in a circular bore 293. The bore 293 is formed in the assembly of metallic and insulating plates, the axis XX' of the bore passing exactly through the focal points of the parabolas forming the metallic plates. The electrode 292 is connected on the one hand to a voltage source V and to earth through two resistors R of substantially equal value, and on the other hand to a pulse generator having an amplitude V/2 through a condenser C. Furthermore the metal plates 280 and 283 are held at a potential V while the metallic plates 281 and 285 are connected to earth.

The operation of this circuit will now be described. The electrode 292 is permanently held at a potential V/2 by the voltage supply V. When a pulse of amplitude V/2 is applied to the electrode, the potential of the electrode reaches the value V which produces an electric discharge between the electrode and the metal plates 281 and 285 held at earth potential. The potential of the electrode decreases to zero and it thus produces a new discharge between it and the plates 280 and 283 that are always maintained at the potential V.

The operation of this laser is as would be expected similar to those previously described.

Such a laser allows high luminous powers to be obtained fairly readily.

The laser shown in FIG. 15 comprises a flat electric excitation line formed by an insulating plate 350 arranged between a first metal plate 351 and a second metal plate 352. A channel 353 is formed in the plate 351 this channel being for containing an active medium. The channel 353 is blocked off by an insulating strip 354. The active medium may be for example nitrogen.

This arrangement comprises a trigger device for initiating a current wave, windows blocking the opposite ends of the channel 353 and other parts as previously described.

The metal plate 351 is divided into two separate parts 355 and 356 by the channel 353. The part 355 arranged on the side of the trigger device is solid and relatively thick and has one end shaped in the form of a parabola. The other part 356 is formed by groups of two stacked elements which are substantially identical. The element 357 comprises an insulating layer 359 disposed between two copper layers 360 and 361 and the element 358 comprises an insulating layer 362 disposed between two copper layers 363 and 364.

As is shown in FIG. 15 the inner layers of copper 361 and 363 are in mutual contact and have a length which is less than that of the external layers 360 and 364. Furthermore an insulating material 365 such as silastene is disposed at the end of the inner copper layers 361 and 363.

The assembly of the two elements 357 and 358 is received in a recess 366 of a frame 367 which itself comprises further recesses 368 and 369. The recesses 368 and 369 receive pairs of elements similar to the elements 357 and 358 although these are not shown.

The frame 367 rests on a metallic plate 390 itself arranged on the insulating plate 350. Finally the external copper layers 360 and 364 are connected to one of the terminals of an excitation circuit providing a potential V while the inner copper layers 361 and 363 are connected to the other terminal which in the circumstances is held at earth potential.

A variant of the laser shown in FIG. 15 is shown in FIG. 16, in which elements referenced generally as 370, 372, 373, 374 are identical to the elements 357 and 358 previously described. These elements are stacked on each other, separated by insulating strips 355 and held adjacent the base of the channel-shaped frame 376. For this purpose a screw 377 cooperating with a spring 378 and arranged in the upper limb of the channel-shaped frame 376 abuts against the upper layer of the stack. This screw sequeezes the stacks together and holds them firmly in position. The connections to the poles of the generator are made for each element in the same way as is the case in FIG. 15.

FIG. 17 shows a second variant of the laser shown in FIG. 15. A frame 367 identical to that described in FIG. 15 receives in each of its recesses 366, 368 and 369 an element such as the element 380 formed by an insulating layer 381 disposed between two copper layers 382 and 383. The element is folded back on itself as shown and furthermore is held at a potential C while the layer 383 is connected to earth.

In each case the part 355 of the first metal plate 351 and the second metal plate 352 are connected to terminals of the generator, the part 355 being held at the potential V, or possibly V/2 while the plate 352 is connected to earth.

The insulator 365 prevents leakage between the layers of copper held at a different potential.

What we claim is:

1. A traveling wave transmission line system for excitation of a laser having an active laser medium comprising: a first substantially flat, electrically conductive metallic plate, said first metallic plate having a first discharge channel for receiving an active laser medium and for dividing said first metallic plate into two distinct portions; a second substantially flat, electrically conductive metallic plate separated from, and substantially parallel to, said first metallic plate and having a second discharge channel for receiving an active laser medium therein and for dividing said second metallic plate into two distinct portions, each forming an end of a first transmission line; said second discharge channel being disposed substantially opposite said first discharge channel; an insulating plate sandwiched between said first and second metallic plates to form said first transmission line; said second metallic plate at a first end thereof being formed as a parabola with an axis of symmetry at an angle to the longitudinal axis of said channel; a substantially point source of electric waves located at the focus of the parabola; pulse charge excitation means coupled to said first end of said transmission line and including means for shorting said line to produce said electric waves at said focus for reflection from said parabolic surface toward said channels as a plane wave perpendicular to said axis of symmetry of said parabola.

2. A transmission line system as defined in claim 1 further comprising: first and second insulating strips respectively fixed onto said first and second metallic plates and respectively covering said first and second channels; and windows, transparent to radiation emitted by the laser, closing both ends of said channels.

3. A transmission line system as defined in claim 1 further comprising a second transmission line substantially identical to said first transmission line, the first metallic plate of said second transmission line being common with the first metallic plate of the said first transmission line, the parabolas formed by the first ends of the second metallic plates of said first and second transmission lines being substantially identical and having their foci and apices lying on the same respective normals to the planes of said metallic plates, said shorting means producing said electric waves at both said foci for reflection from both parabolic surfaces towards said channels as plane waves perpendicular to the axis of symmetry of said parabolas.

4. A transmission line system as defined in claim 3 further comprising first and second insulating strips respectively covering the discharge channels in the second metallic plates of said first and second transmission lines, the discharge channel in the common first metallic plate of said first and second lines being closed by the insulating plates of said transmission lines.

5. A transmission line as defined in claim 1 wherein said first metallic plate at a first end thereof is also formed as a parabola, the dimensions of the parabolas of said first and second metallic plates being substantially identical, the foci and apices of the parabolas lying on the same respective normals to the planes of said metallic plates, said shorting means producing said electric wave at both said foci for reflection from both parabolic surfaces toward said channels as plane waves perpendicular to the axes of symmetry of said parabolas.

6. A transmission line system as claimed in claim 5 wherein said excitation means comprises two spaced electrodes arranged substantially along the same axis in a chamber of a dielectric material and containing a gas, the chamber passing through said first and second metallic plates as well as said insulating plate, and being positioned so that the axis along which said electrodes are situated passes substantially through the foci of the parabolas, the chamber being formed by a tube arranged in bores in first and second metal blocks separated by an insulating material, said first block being carried on said first metallic plate and said second block being carried on said second metallic plate, the ends of the tube being closed by flat seals through which said electrodes pass.

7. A transmission line system as claimed in claim 6, wherein the space between the tube and the metal blocks is sealed with an insulating material.

8. A transmission line system as claimed in claim 7, wherein an annular groove is formed in both metal blocks on their inner faces, the insulating plates only extending through this annular groove to abut the tube, and wherein the space surrounding the insulating plate is filled with the insulating material.

9. A transmission line system as claimed in claim 6 wherein the electrodes are connected to the respective metal plates by one of the metal blocks and by an additional metal plate disposed on the upper face of the other metal block.

10. A transmission line system as claimed in claim 9, wherein the electrodes are helf firmly in position by washers which are screwed to their respective metal blocks.

11. A transmission line system as claimed in claim 10, wherein a toroidal seal is placed inside the washers to ensure a gas-tight seal of the electrodes.

12. A transmission line system as claimed in claim 6, wherein the electrodes are hollow and are provided with apertures in their walls so that a gas may be introduced into the tube.

13. A transmission line system as claimed in claim 1 wherein said insulating plate is a flexible insulating strip, and said metallic plates comprise respective metallic layers deposited on opposite sides of a flexible insulating sheet so as to form a non-rigid assembly, and further comprising means for maintaining the medium in each of the channels.

14. A transmission line system as claimed in claim 13, wherein the means for maintaining the medium in each of the channels of the metallic layers comprises an insulating strip resting on metallic wedges having a length approximately equal to that of the insulating strip and disposed on either side of each of the channels.

15. A transmission line system as claimed in claim 13 comprising a second transmission line substantially identical to said first transmission line, the first metallic layer of the second line being separated from the second metallic layer of the first line by metal wedges having a length substantially equal to that of the insulating strips and disposed on either side of the channels arranged in the metallic layers.

16. A transmission line system as claimed in claim 15 wherein the first channel of the first metallic layer of the first electric excitation line and the channel of the second metal layer of the second electric excitation line are each closed off by an insulating strip resting on metallic wedges having a length substantially equal to that of the insulating strip and being disposed on either side of the channels.

17. A transmission line system as claimed in claim 13 wherein said excitation means comprises a trigger device disposed adjacent the channels by folding said flexible insulating sheet and associated metal layers back on themselves, the assembly being surrounded by a protective envelope.

18. A transmission line system as claimed in claim 17, wherein the protective envelope is formed by a polyethylene cover.

19. A transmission line system as claimed in claim 3 wherein said excitation means comprises at least one electrode disposed coaxially in a bore formed in the plates of the excitation lines, the axis XX' of the bore being perpendicular to the plane of the plates and passing through the focal points of the parabolas, wherein the electrode is adapted to be held at a constant potential and connected to a pulse generator having an amplitude at least equal to the value of the potential.

20. A transmission line system as claimed in claim 19 further comprising a third transmission line identical to said first and second lines, and wherein alternate metal plates of the transmission lines are adapted to be held at a potential substantially equal to the sum of the potential of the electrode and the amplitude of the pulses from the pulse generator, while the intermediate plates are adapted to be held at substantially earth potential.

21. A transmission line system as claimed in claim 19 wherein the electrode is held at a desired potential having a substantially constant value by connecting the electrode to a source potential having a value double that of the desired potential and to a source of zero potential, this connection being effected through the intermediary of two resistors R having substantial equal resistance.

22. A transmission line system as claimed in claim 19 wherein the alternate plates of the transmission lines are adapted to be connected to a source of potential whereas the intermediate plates are adapted to be connected to earth.

23. A transmission line system as claimed in claim 19 wherein the distance between the electrode and the metal plates is chosen so that the discharge only occurs for a value of electrode potential which is substantially equal to double said constant potential.

* * * * *